United States Patent
Bordonaro et al.

(10) Patent No.: US 7,929,571 B2
(45) Date of Patent: Apr. 19, 2011

(54) SYSTEM AND METHOD FOR IMPLEMENTING A PREEMPTIVE RETRANSMIT FOR ERROR RECOVERY IN A COMMUNICATIONS ENVIRONMENT

(75) Inventors: Frank G. Bordonaro, Cary, NC (US); John P. Fussell, Raleigh, NC (US); Bernie P. Pearce, Morrisville, NC (US); Paul A. Schmidt, Cary, NC (US); Uwe Sellentin, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 1117 days.

(21) Appl. No.: 11/330,578

(22) Filed: Jan. 12, 2006

(65) Prior Publication Data

US 2007/0159967 A1 Jul. 12, 2007

(51) Int. Cl.
    *H04J 3/18* (2006.01)
(52) U.S. Cl. ........................... 370/477; 370/229
(58) Field of Classification Search .................. 370/229, 370/277, 395, 477, 465, 395.4, 474, 473
    See application file for complete search history.

(56) References Cited

U.S. PATENT DOCUMENTS

| | | | | |
|---|---|---|---|---|
| 5,894,557 | A | 4/1999 | Bade et al. | 395/200.58 |
| 6,134,245 | A | 10/2000 | Scarmalis | 370/474 |
| 6,192,051 | B1 | 2/2001 | Lipman et al. | 370/389 |
| 6,363,065 | B1 | 3/2002 | Thornton et al. | 370/352 |
| 6,400,722 | B1 | 6/2002 | Chuah et al. | 370/401 |
| 6,477,595 | B1 | 11/2002 | Cohen et al. | 710/105 |
| 6,512,754 | B2 | 1/2003 | Feder et al. | 370/338 |
| 6,512,773 | B1 | 1/2003 | Scott | 370/395.61 |
| 6,535,482 | B1 | 3/2003 | Hadi Salim et al. | |
| 6,771,672 | B1 | 8/2004 | Ansley et al. | 370/552 |
| 6,901,049 | B1 | 5/2005 | Chapman | 370/230 |
| 7,068,684 | B1 | 6/2006 | Suder et al. | |
| 2002/0172201 | A1* | 11/2002 | Ido et al. | 370/389 |
| 2003/0014764 | A1* | 1/2003 | Saladino et al. | 725/111 |
| 2003/0179720 | A1 | 9/2003 | Cuny | |
| 2003/0206521 | A1 | 11/2003 | Qiao | |
| 2003/0206530 | A1* | 11/2003 | Lindsay et al. | 370/277 |
| 2005/0058149 | A1 | 3/2005 | Howe | |
| 2005/0207437 | A1 | 9/2005 | Spitzer | |
| 2005/0286416 | A1 | 12/2005 | Shimonishi et al. | |

(Continued)

FOREIGN PATENT DOCUMENTS

WO   WO 2007/086996 A2   8/2007

(Continued)

OTHER PUBLICATIONS

Bordonaro et al., "System and Method for Addressing Dynamic Congestion Abatement for GSM Suppression/Compression," U.S. Appl. No. 11/469,496, 46 pgs, filed Sep. 1, 2006.

(Continued)

*Primary Examiner* — Derrick W Ferris
*Assistant Examiner* — Christopher R Crompton
(74) *Attorney, Agent, or Firm* — Baker Botts L.L.P.

(57) ABSTRACT

A method for communicating data is provided that includes receiving a plurality of bits associated with a communications flow and determining whether one or more samples included in the flow should be suppressed. The method also includes suppressing a selected one or more of the samples. The method also includes retransmitting certain samples when a given sample has stopped changing, in comparison to a previously received sample, for a configured time interval.

28 Claims, 4 Drawing Sheets

U.S. PATENT DOCUMENTS

| | | | |
|---|---|---|---|
| 2006/0056416 A1* | 3/2006 | Yang et al. | 370/395.2 |
| 2006/0215574 A1 | 9/2006 | Padmanabhan et al. | |
| 2006/0268689 A1 | 11/2006 | Tarraf et al. | |
| 2008/0031131 A1 | 2/2008 | Bordonaro et al. | |

FOREIGN PATENT DOCUMENTS

WO     WO 2007/086996 A3     8/2007

OTHER PUBLICATIONS

Bordonaro et al., "System and Method for Detecting and Regulating Congestion in a Communications Environment," U.S. Appl. No. 11/462,500, 42 pgs, filed Aug. 4, 2006.

U.S. Patent and Trademark Office, First Office Action for U.S. Appl. No. 11/462,500, filed Aug. 4, 2006, Mailed Aug. 25, 2008.

U.S. Patent and Trademark Office, Final Office Action for U.S. Appl. No. 11/462,500, filed Aug. 4, 2006, Mailed Jan. 6, 2009.

U.S. Patent and Trademark Office, First Office Action for U.S. Appl. No. 11/469,496, filed Sep. 1, 2006, Bordonaro et al., Mailed Aug. 22, 2008.

U.S. Patent and Trademark Office, Final Office Action for U.S. Appl. No. 11/469,496, filed Sep. 1, 2006, Bordonaro et al., Mailed Jan. 6, 2009.

Notification of Transmittal of the International Search Report and the Written Opinion of the International Searching Authority, or the Declaration, International Application No. PCT/US06/44436, 8 pages, Mailed Sep. 28, 2007.

U.S. Patent and Trademark Office, Interview Summary for U.S. Appl. No. 11/462,500, filed Aug. 4, 2006, Bordonaro et al., Mailed Mar. 5, 2009.

U.S. Patent and Trademark Office, Interview Summary for U.S. Appl. No. 11/469,496, filed Sep. 1, 2006, Bordonaro et al., Mailed Mar. 5, 2009.

State Intellectual Property Office of the People's Republic of China, The First Office Action, Patent Application No. 200680051020.5, Chinese Office Action and English translation, transmitted to Baker Botts L.L.P. Jul. 19, 2010, 6 pages.

* cited by examiner

SYSTEM AND METHOD FOR IMPLEMENTING A PREEMPTIVE RETRANSMIT FOR ERROR RECOVERY IN A COMMUNICATIONS ENVIRONMENT

TECHNICAL FIELD OF THE INVENTION

The present invention relates in general to the field of communications and, more particularly, to a system and a method for implementing a preemptive retransmit for error recovery in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may consider compressing common communication patterns that appear on a given communication link. However, many of the existing compression/suppression protocols are deficient because they are static, unresponsive, and rigid. Moreover, many such systems add overhead to the system, while not addressing error issues. Accordingly, the ability to provide a communications system that consumes few resources, addresses error issues, optimizes bandwidth, and achieves minimal delay presents a significant challenge for network operators, service providers, and system administrators.

SUMMARY OF THE INVENTION

From the foregoing, it may be appreciated by those skilled in the art that a need has arisen for an improved communications approach that optimizes error recovery in a communications environment. In accordance with one embodiment of the present invention, a system, and a method for providing a preemptive retransmit are provided that substantially eliminate or greatly reduce disadvantages and problems associated with conventional compression/suppression techniques.

According to one embodiment of the present invention, a method for communicating data is provided that includes receiving a plurality of bits associated with a communications flow and determining whether one or more samples included in the flow should be suppressed. The method also includes suppressing a selected one or more of the samples. The method also includes retransmitting certain samples when a given sample has stopped changing, in comparison to a previously received sample, for a configured time interval. This would achieve a preemptive retransmit function for error recovery.

Certain embodiments of the present invention may provide a number of technical advantages. For example, according to one embodiment of the present invention, a communications approach is provided that enhances voice/session quality for a given architecture. This is a result of an ability to correct errors that occur in voice calls using GSM compression/suppression without waiting for the typical round-trip delay time (e.g. normally 700 milliseconds for satellite links). In general, the present invention minimizes the amount of information being retransmitted, which conserves bandwidth. Moreover, such an approach corrects errors with minimal overhead. In addition, there is no need for an acknowledgement from a peer device. Such an acknowledgment would only increase the amount of information propagating along the backhaul.

Note that this savings in bandwidth is in addition to the improvements yielded through the basic suppression scheme (outlined herein in this document), which recognizes repetitious patterns. A given input bit stream may be identified as a candidate for suppression. Subsequently, the bit pattern is not transmitted over the backhaul, whereby the suppressed data can be simply played out or restored on the other end of the link.

Additionally, such upgrades or enhancements may be provided to an existing system with minimal effort. A simple algorithm may be used to leverage infrastructure already in place. Thus, a complete system overhaul is not necessary. Such advantages may be particularly beneficial to service providers, as effective compression protocols significantly reduce their operating expenditures.

Note also that such a solution is flexible in that it can be extended to include satellite or landline communications. In a similar vein, such a solution can be easily extended to signaling and packet data channels. This further allows such a configuration to accommodate a wide range of incoming flows, as it may be extended to a number of different types of traffic arrangements. Additionally, minimal overhead is incurred as a result of the operations of the present invention.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
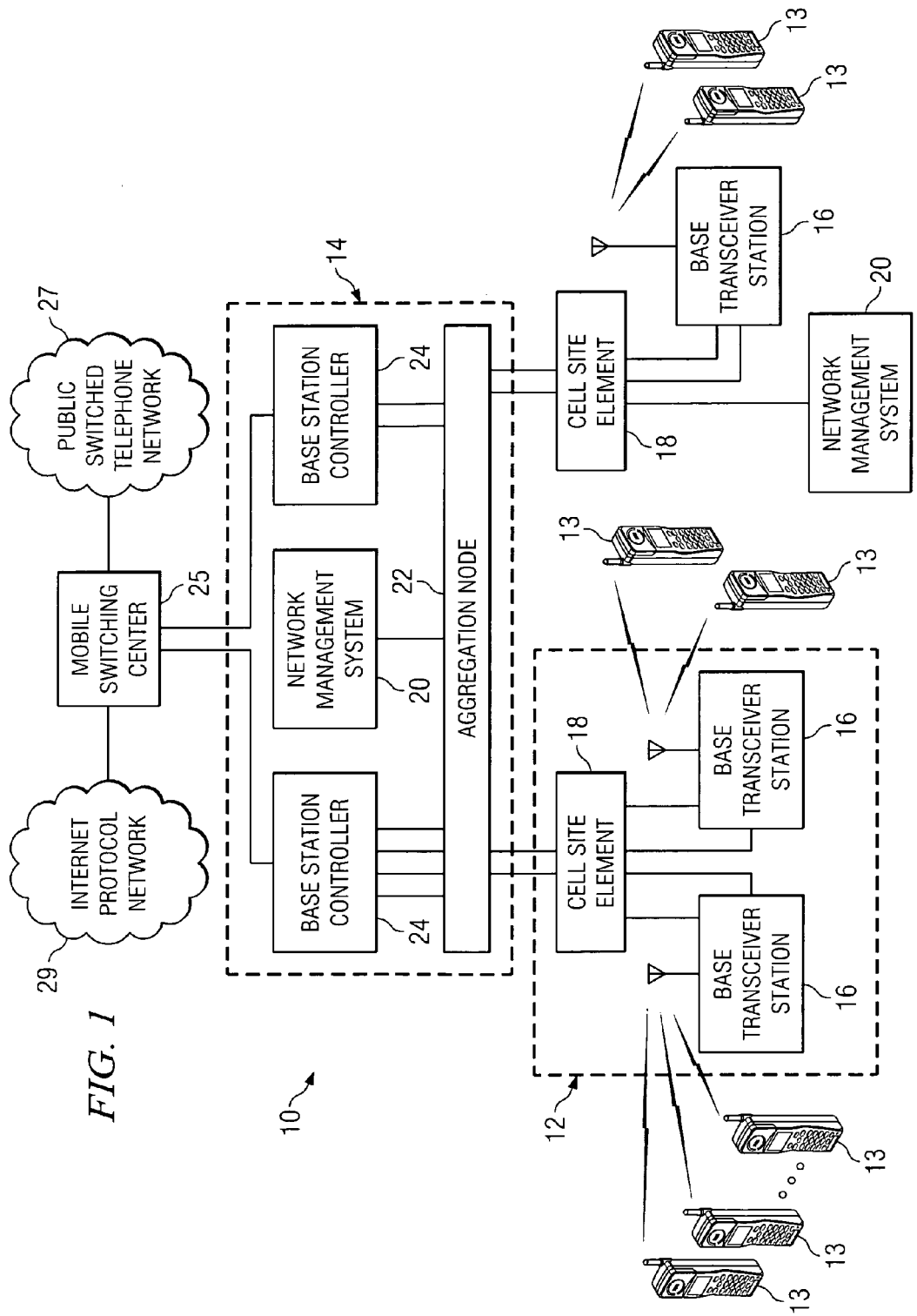
FIG. 1 is a simplified block diagram of a communication system for providing a preemptive retransmit for error recovery in a network environment.

FIG. 1 is a simplified block diagram of a communication system 10 for providing a preemptive retransmit for error recovery in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note the communications links extending between cell site element 18 and aggregation node 22, as compared to the number of communication links extending between cell site element 18 and base transceiver stations 16. This arrangement has been provided in order to illustrate that without the present invention, the number of communication links between cell site 12 and central office site 14 would be equal to the output of base transceiver stations 16. By implementing the suppression techniques of the present invention (and as explained in detail below), a reduction in communication links between cell site 12 and central office site 14 is achieved.

Communication system 10 may generally be configured or arranged to represent 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

As illustrated in FIG. 1, in a GSM network, a backhaul network exists between a BTS and a BSC. The backhaul can be used to transmit voice conversations, data, and control information using various standards and proprietary vendor specific formats. In order to address operational expenses, a backhaul optimization scheme is desired that will provide significant bandwidth savings, while maintaining low latency and end-to-end transmissions for all possible frame types.

In accordance with the teachings of the present invention, communication system 10 eliminates the need for a round-trip delay by retransmitting selected samples when the sample has stopped changing (i.e. the sample pattern is static) for a configurable about of time. In a general sense, samples are only being retransmitted when they have stopped changing. [Note that 'changing' in this context is meant to connote a change in the current sample as compared to the sample that came immediately before that sample.] This avoids retransmitting samples that are constantly changing, while ensuring that any change that was critical for the call is transmitted a second time (within an acceptable limit). It also conserves bandwidth by not retransmitting samples that are static. The present invention enables compression samples to be preemptively retransmitted only when the sample is one that may cause an extended disruption of service, a significant degradation in call quality, or a lost call.

In accordance with another aspect of the present invention, communication system 10 operates to suppress unused, idle, and redundant information in offering an optimal solution for the backhaul network. This can be achieved by dynamically detecting and suppressing repeating bit patterns embedded in subsequent 8 Kbps sub-rate frames and then recreating the suppressed data at the far end of the communications link. These operations can be performed regardless of the frame format and the sub-rate width being employed at any given time. Thus, an incoming bit pattern may be evaluated to determine whether it can be suppressed. A bit pattern can be played out or restored on the opposite end of the communication link to mimic the data in cases where the frame is designated for suppression. The restoration function includes suitable ordering and timing operations. This recognition (of prevalent repeating streams) would allow the greatest savings for any compression operation. In cases where the incoming pattern is not a candidate for suppression (i.e. not repetitious), the entire bit pattern could then be sent, as the architecture would be unable to suppress all of the diverse bit patterns in a given backhaul with fewer bits. A demultiplexer, which is positioned downstream, may then simply perform a series of reverse operations in identifying the suppressed information and playing out the data.

Preprocessing of the input bits can be done such that the samples being considered for suppression are not necessarily consecutive bits from the input stream, but can be selected such that they are most likely to be suppressible. Hence, the present invention provides for the reordering of input bits, the selection of samples from the reordered bit stream, and the restoration of proper bit ordering.

Using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement. The enhancement in transmission can be provided in both aggregation node 22 and cell site element 18, as the present invention bi-directional.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Note that when packets are being transmitted over a high-latency backhaul network, such as over a satellite communications link or over multiple router hops, it is possible that backhaul packet errors will occur, resulting in lost voice or data samples. This is particularly problematic in the case of GSM compression, or for any algorithm that relies on transmitting the delta between a sample and the previous sample. For voice telephone calls, the result could be extended periods of undesirable noise.

Typically, a lost or errored packet can be detected by the receiver. One of the following actions is typically taken: 1) the receiver requests a retransmission of the missing or errored data [In the case of GSM compression using a single hop high low latency communications link, this is sufficient because the round trip time is about 40 milliseconds.]; and 2) the receiver ignores the missing or errored data. In many voice applications, this is sufficient because the lost or missing data will be replaced during the next sample. It is not acceptable for GSM compression (or other algorithms that transmit only the deltas) because a new delta may not exist for an extended period.

The present invention addresses these issues, and others, in the following way. A backhaul packet is transmitted every two milliseconds, whereby each backhaul packet contains information about 1/10 (in this example) of a normal GSM TRAU frame. The backhaul packet principally contains a bit map and a 16-bit sample for each 8 kbps subrate that has changed between the current and tenth previous sample. Samples that have not changed are excluded from the backhaul packet. Since a packet is transmitted every two milliseconds, and ten samples are required for a complete frame, the receiving node can replay a TRAU every 20 milliseconds.

When an error occurs in a backhaul packet, it can cause a portion of a normal TRAU frame to be incorrect. Consider for example if the bits that make up the TRAU synchronization header are in error. If there is no recovery, the receiving node will replay an incorrect TRAU frame every 20 milliseconds. If a round-trip delay time is incurred for a satellite network, invalid TRAU frames could stagnate (e.g. for as long as 700 milliseconds).

Communication system 10 eliminates the need for the round-trip delay by retransmitting selected samples when a given sample has stopped changing for a configurable about of time. In this way, samples are only retransmitted when they have stopped changing. This avoids retransmitting samples that are continually changing, while it guarantees redundancy such that any change that was critical is transmitted a second time.

The present invention enables compression samples to be preemptively retransmitted only when the sample is one that may cause a degradation in call quality. In addition, the present invention offers numerous advantages over existing architectures that attempt to address the issues outlined above. For example, errors that occur in voice calls using GSM compression/suppression can be corrected without waiting for the typical 700-millisecond round-trip delay time associated with satellite links. The present invention also minimizes the amount of information being retransmitted, which conserves bandwidth. Other advantages are described below with reference to corresponding FIGURES. The discussion immediately below focuses on the components of FIG. 1.

Mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60, Frame Relay, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within, or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Figure 2:
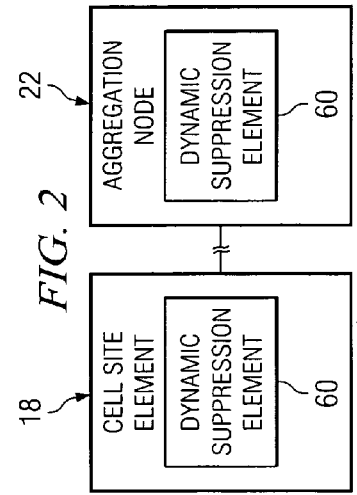
FIG. 2 is a block diagram of an example internal structure associated with either a cell site element or an aggregation node of the communication system.

FIG. 2 is a simplified block diagram of an example internal structure of cell site element 18 and aggregation node 22, both of which include a dynamic suppression element 60. In one embodiment, dynamic suppression element 60 is an algorithm (potentially included in appropriate software) that achieves the suppressing operations and/or the preemptive retransmit protocol for error recovery as described herein.

The functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

The collected samples may be compared to a few pre-identified (or previously learned) patterns (e.g. the previously occurring input streams) and decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that dynamic suppression element 60 may be changed considerably, as it offers only one example suppression protocol configuration that accommodates any of the identified incoming bit patterns. Any number of alternative bit patterns may be readily accommodated by communication system 10 and are, therefore, included in the broad scope of its teachings. These common patterns may be based on particular communication needs or on the prevalence of commonly reoccurring bit patterns in a given communications architecture. Additionally, any attached header bits may also provide E1/T1 line conditions and alarms. In other embodiments, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10. Additionally, dynamic suppression element 60 can be used to transport any TDM stream over IP. For example, some applications use TDMA and GSM on the same E1 (i.e. TDM on some timeslots, GSM on others). The present invention transports all such information over IP and restores the bit stream on the far end of TDM E1. For some TDMA applications, there is not a lot of suppression occurring, but the system is still functional.

Figure 3:
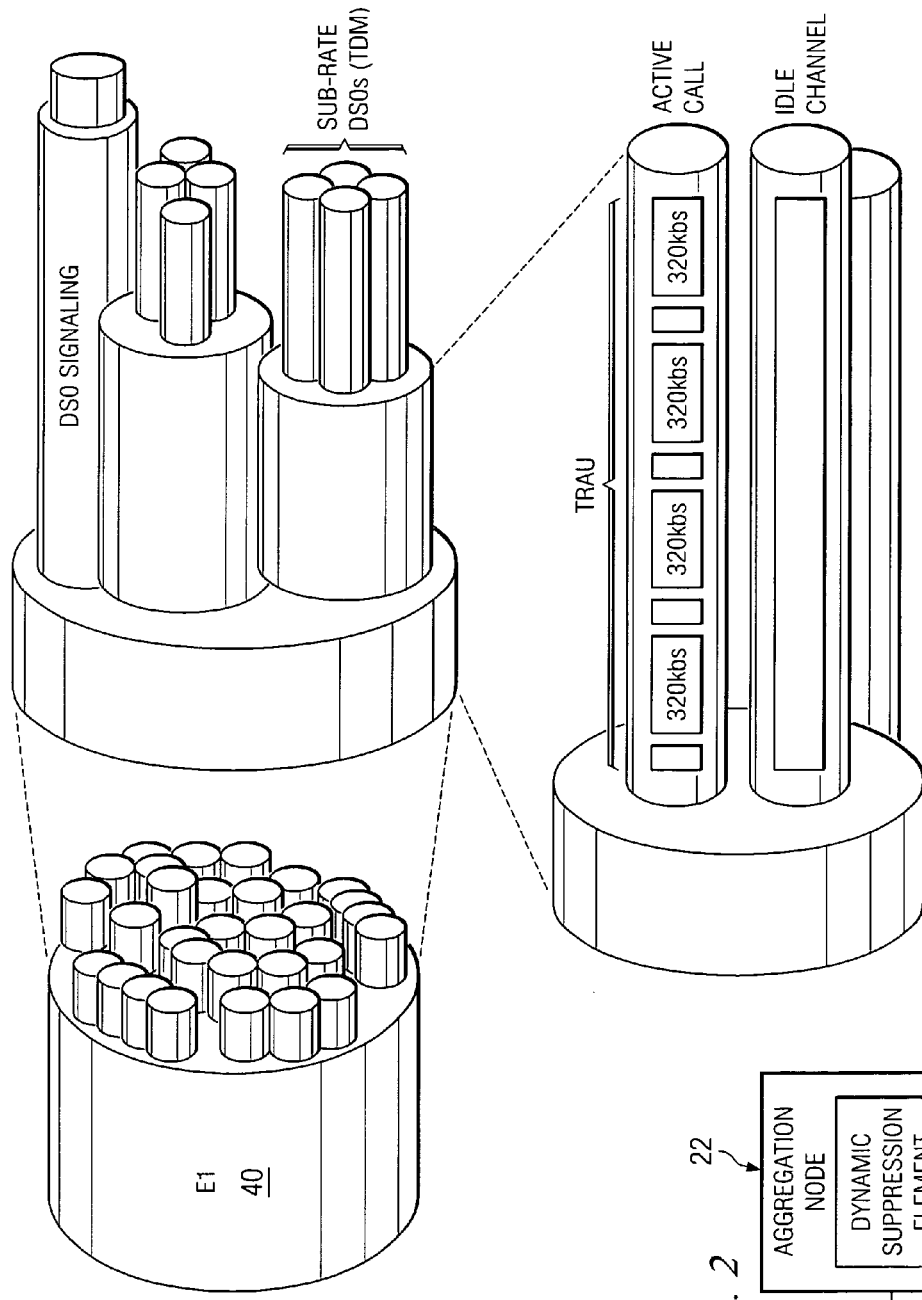
FIG. 3 is a simplified schematic diagram of an example GSM 8.60 format.

Before turning to FIG. 3, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data or communicating a preemptive retransmit for error recovery as implied, described, or offered herein.

As identified above, each of these elements may include software and/or an algorithm to effectuate suppression for voice or packet data applications as described herein. Alternatively, such suppression and retransmit operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

FIG. 3 is simplified block diagram of an example GSM 8.60 format E1 structure. In operation of an example embodiment, consider a case where an end user is having a conversation using a mobile station. Voice frames from a given mobile station are generally being generated every 20 milliseconds in such a scenario. In a typical environment, there are 320-bit frames that are sent directly behind each other. In a native environment, base transceiver station 16 receives this information and converts it into TRAU frames. There is control information that is exchanged (on another channel) between base transceiver station 16 and base station controller 24 (over an E1 link 40) that indicates which channel or which sub-rate that will be assigned for this call.

When a call comes up, these frames (which are primarily of a fixed length) are put into T1/E1 sub-rates, whereby a DS0 is eight bits. These eight bits can be further divided into sub-rates (an 8 kilobit sub-rate corresponds to a single bit, a 16 kilobit sub-rate corresponds to two bits, a 32 kilobit sub-rate corresponds to four bits, and a 64 kilobit sub-rate corresponds to the full DS0).

In a simple case, a call is on a 16 kilobit sub-rate channel and it will be assigned to a time slot (and assigned one sub-rate inside that time slot) for transmission over the E1. Every 125 microseconds, two bits of the frame are being sent across the E1. Base station controller 24 receives this information, assembles the frames, and then presents them to the TRAU.

In accordance with the operation of the present invention, the framing protocol that is used (e.g. 16 kilobit TRAU frames, half-rate calls, etc.) is ignored. The algorithm of the present invention will universally divide the channel into 8-kilobit sub-rates. In this manner, synchronization is not being attempted; only the raw bits are being evaluated. The algorithm can begin to collect bits on an 8-kilobit sub-rate basis. For example, if a full E1 is present, then 31 time slots (each time slot having 8 sub-rates) are present that could have data. Hence, a total of 248 eight-kilobit sub-rates could be active.

In this example embodiment, an FPGA could be employed to monitor the line and to separate the bits into 248 sub-rates. The FPGA can also collect a sample that contains 16 bits for each sub-rate (every two milliseconds). The FPGA can also perform demultiplex operations. After the two-millisecond interval elapses, the FPGA then has 16 bits collected for each sub-rate. The FPGA can then send an interrupt signal to IOS with this new packet (i.e. the super-frame) that has information for each of the sub-rates. From IOS, there will be 3968 bits (plus header bits), which consists of 248 samples of 16 bits each.

Over a period of ten samples, that data would add up to approximately a frames worth of data. Recall that the frames are of a fixed length (e.g. 160 bits). The algorithm can now take these and forward them to the other end (i.e. the base station controller) such that they can be demultiplexed and regenerated. Coupled to this super-frame is a header, which can be a bit-mask (where there is one bit for each possible 16-bit sample). It should be noted that the bit mask is not always necessary (i.e. not included in the backhaul frame header). In order to compress the data, the IOS records and saves ten samples (in a row) and then compares the sample that is currently being evaluated with a sample that occurred ten samples ago. Stated differently, the algorithm compares the sample that it received for that sub-rate to the same sample that it received ten instances ago. Thus, the algorithm compares new bits to similar bits that would have been provided in the same bit position in a previous frame. The present invention capitalizes on the intrinsic nature of the data and the inherent characteristics of the fixed length restrictions.

The suppression changes dynamically based on the data that is being communicated. In addition, protocols such as HDLC can be significantly optimized such that flags will synchronize or line-up such that they are compressed out. Similarly, idle frames (or idle periods between frames) or silence will readily be compressed.

Figure 4:
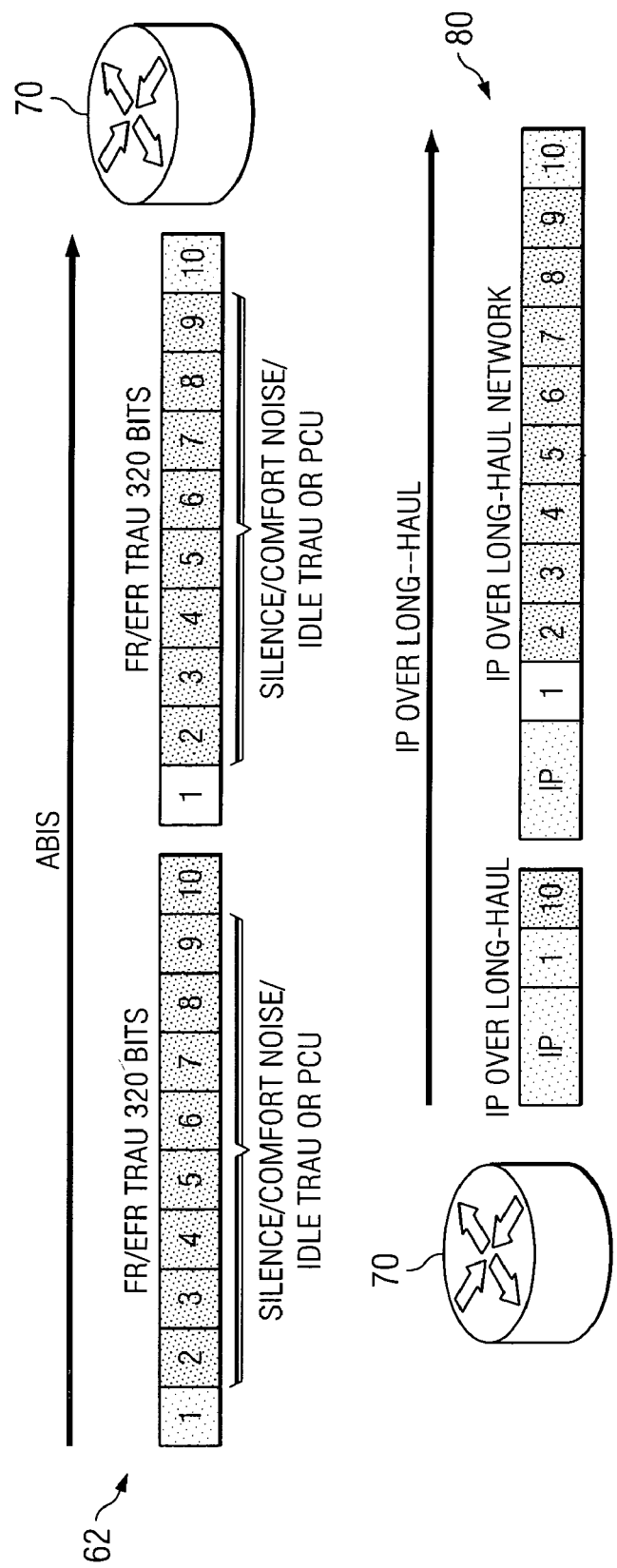
FIG. 4 is a simplified schematic diagram of an example associated with the communication system.

FIG. 4 is a simplified block diagram of an example that illustrates some of the concepts that have been discussed above. It should be emphasized that such an illustration is only a logical view of the present invention. Specifically, a single TRAU frame is generally not sent in the same IP backhaul packet, as FIG. 4 suggests. FIG. 4 has only been offered for purposes of teaching and discussion. Indicated generally at 62 are two TRAU frames being received by a router 70 (or a switch, a gateway, etc.), which is located on the base station controller side of the network. These represent the standard 320-bit frames that are coming into the system. Within the frames are the samples that were described previously. The first of these TRAU frames that is being received by router 70 is indicative of the whole sample, which should be sent unchanged (as it is the first sample).

This first sample is stored by router 70 and then the second of these TRAU frames is received by router 70. Now two samples can be compared (i.e. samples from one frame can be compared to samples from a previous frame). In this example, samples 2-9 are the same and, hence, do not have to be transmitted on the backhaul. An IP over long-haul element 80 is provided that illustrates how the data is actually transmitted across the backhaul. As identified earlier, the first TRAU frame is still transmitted over the backhaul. However, the second TRAU frame is handled differently, as the algorithm of the present invention can readily identify this opportunity for suppression/compression. In the second packet that is being sent samples 2-9 are not included. Only samples 1 and 10 are being sent in the second packet because only those samples are different between the two packets.

Hence, when samples between two frames are different, then the samples are included in the packet and sent across the backhaul. When samples are the same, then there is no need to send them over the backhaul. The repeating samples only need to be played back and not transmitted over the backhaul. Stated in another way, only the "deltas" are transmitted over the backhaul. The delta reflects the difference in the bits that would be in the same position of the previous frame.

Another aspect of the present invention addresses the preemptive retransmit issue outlined earlier in the Specification. Recall that packets are made up of samples, which can include a delta for a voice packet that was transmitted on the backhaul. The samples in that voice packet need to be played out (in real-time at the other network end) into TRAU frames. A typical TRAU frame can be divided into ten different samples. In cases where a packet propagating across the backhaul is lost, and the delta was also lost, the component at the remote end would not be able to detect this change. The remote-end device would continue to transmit incorrect bits. This is not necessarily a problem in all cases because the samples (in a voice conversation) are constantly changing. Hence, such a problem could go unnoticed, as only a small (barley audible) glitch may occur during the call. However, in the case that errors occur in a first non-identical sample followed by identical samples, the time associated with the glitch is more substantial.

In landline scenarios, a typical protocol in which the receiver detects an error and requests a retransmission can be used because recovery can occur within several milliseconds. However, if there are errors that propagate along a satellite path, the time associated with the aforementioned glitch and typical error recovery could be about 700 milliseconds. In such a case, the call could be significantly interrupted and even inaudible in some scenarios.

Figure 5:
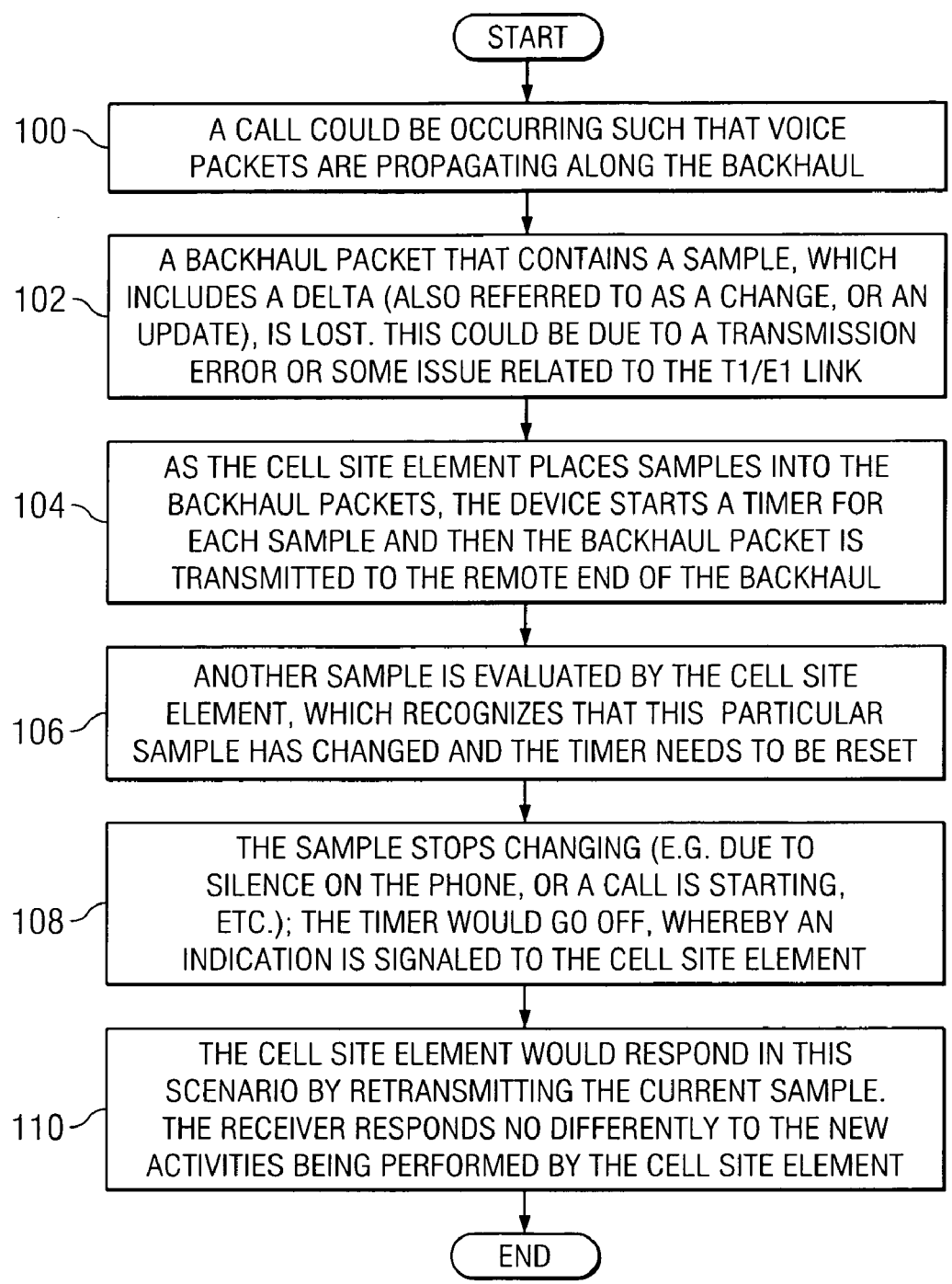
FIG. 5 is a simplified flowchart illustrating some example steps associated with one example operation of the present invention.

One approach to address this issue is a preemptive retransmit, as is proposed by the present invention. This occurs when it is detected that a sample has stopped changing for a certain amount of time [e.g. 10 milliseconds], which is user-configurable. Hence, the sample that did not change will be transmitted. This guarantees that the remote end will receive the update or the delta, even in cases where the original packet, which included that change, was lost. This approach provides the advantage of correcting errors with a small amount of overhead, where there is no need for an acknowledgement from a peer device. FIG. 5 is provided in order to further elucidate some of the teachings of the present invention.

FIG. 5 is a simplified flowchart illustrating an operation associated with the preemptive retransmit aspect of communication system 10. In operation of an example flow, a call could be occurring such that voice packets are propagating along the backhaul. This is illustrated by step 100. At step 102, a backhaul packet that contains a sample, which includes a delta (also referred to as a change, or an update), is lost. This could be due to a transmission error or some other issue related to the T1/E1 link.

In such an instance, the device transmitting the backhaul packets (e.g. cell site element 18) is continuously taking samples from the A-bis interface and positioning them into backhaul packet(s). As cell site element 18 places these samples into the backhaul packets, the device starts a timer for each sample and then the backhaul packet is transmitted to the remote end of the backhaul. This is illustrated by step 104. At step 106, another subsequent sample is evaluated by cell site element 18, which recognizes that this particular sample has changed and the timer needs to be reset. It should be noted that, from the perspective of this device, it does not matter if the previous sample was lost. The update is currently being sent by cell site element 18 at this juncture in time so the call is experiencing reasonable call quality.

At step 108, the sample stops changing (e.g. due to silence on the phone, or a call is starting, etc.). The timer would, in effect, go off or expire, whereby an indication is signaled to cell site element 18. Cell site element 18 would respond in this scenario by retransmitting the current sample. This is illustrated by step 110. The receiver (e.g. aggregation node 22) in such a case is reassembling samples into TRAU frames. The samples continue to change and there is no issue for aggregation node 22 to address. If a backhaul packet is lost, the current pattern is repeated and such a glitch would be barely audible to the human ear. If the sample changed, aggregation node 22 would replace it when the device received the next sample. If a frame were lost and it happened to include the last sample that changed, aggregation node 22 would wait for the time interval outlined above (e.g. 10 milliseconds) and then receive the new sample, as though the sample had changed. Hence, the receiver responds no differently to the new activities being performed by cell site element 18. Aggregation node 22 is oblivious to the new preemptive actions of cell site element 18 and, furthermore, behaves in a consistent routine manner.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 5, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, and suppression techniques. In addition, any of the described elements may be provided as separate external components to communication system 10 or to each other where appropriate. The present invention contemplates great flexibility in the arrangement of these elements as well as their internal components.

In addition, although the preceding description offers a suppression protocol to be implemented with particular devices (e.g. aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only. Also, such a preemptive retransmit solution is equally applicable to landline scenarios, as the preemptive approach could be used to address the error issues identified above.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
a cell site element associated with a base transceiver station, the cell site element configured to perform the following for a first configured amount of time:
receive a plurality of bits associated with a communications flow;
determine that one or more samples of a plurality of samples included in the flow should be suppressed;
suppress the selected one or more of the samples by not transmitting the one or more selected samples; and
transmit a sample of the plurality of samples if the sample has changed in comparison to a previously transmitted sample;
the cell site element further configured to:
retransmit the sample when the sample has stopped changing, in comparison to a previously received sample, for a second configured amount of time, the second configured amount of time beginning after the start of the first configured amount of time.

2. The apparatus of claim 1, wherein the cell site element is further configured to position unique samples that are included in the flow in a super-frame to be communicated to a next destination.

3. The apparatus of claim 2, wherein the flow is associated with a satellite communication.

4. The apparatus of claim 2, wherein the selected samples reflect patterns that correspond to one or more data segments that are common to an associated network.

5. The apparatus of claim 4, wherein the data segments correspond to silence data, idle data, control data, repetitive voice data, or user data.

6. The apparatus of claim 2, wherein the second configured amount of time is about 10 milliseconds.

7. The apparatus of claim 2, wherein the unique samples may be received and evaluated in order to restore a plurality of bits associated with the communications flow.

8. The apparatus of claim 2, wherein the cell site element is configured to evaluate bit positions of a current sample of a current frame and to compare those with bit positions of a previous sample in order to determine whether to perform a suppression operation associated with the flow.

9. The apparatus of claim 2, wherein the cell site element includes a dynamic suppression element that is configured to perform the suppression and positioning operations.

10. The apparatus of claim 2, further comprising:
an aggregation node associated with a base station controller and configured to communicate with the cell site element and to receive the super-frame.

11. A method for communicating data, comprising: performing the following for a first configured amount of time:
receiving a plurality of bits associated with a communications flow;
determining, by a processor, that one or more samples of a plurality of samples included in the flow should be suppressed;
suppressing, by the processor, the selected one or more of the samples by not transmitting the one or more selected samples; and
transmitting a sample of the plurality of samples if the sample has changed in comparison to a previously transmitted sample and
retransmitting, by the processor, the sample when the sample has stopped changing, in comparison to a previously received sample, for a second configured amount of time, the second configured amount of time beginning after the start of the first configured amount of time.

12. The method of claim 11, further comprising:
positioning unique samples that are included in the flow in a super-frame to be communicated to a next destination.

13. The method of claim 12, further comprising:
receiving the unique samples; and
evaluating the unique samples in order to restore a plurality of bits associated with the communications flow.

14. The method of claim 12, wherein the selected samples reflect patterns that correspond to one or more data segments that are common to an associated network.

15. The method of claim 14, wherein the data segments correspond to silence data, idle data, or control data, repetitive voice data, or user data.

16. The method of claim 12, wherein the flow is associated with a satellite communication.

17. The method of claim 12, wherein the second configured amount of time is about 10 milliseconds.

18. The method of claim 12, further comprising:
evaluating bit positions of a current sample of a current frame and comparing those with bit positions of a previous sample in order to determine whether to perform a suppression operation associated with the flow.

19. A non-transitory computer readable medium embodied with computer software code such that when executed by a processor is configured to perform the following for a first configured amount of time:
receive a plurality of bits associated with a communications flow;
determine that one or more samples of a plurality of samples included in the flow should be suppressed;
suppress the selected one or more of the samples by not transmitting the one or more selected samples; and
transmit a sample of the plurality of samples if the sample has changed in comparison to a previously transmitted sample; and
the software code further configured to:
retransmit the sample when the sample has stopped changing, in comparison to a previously received sample, for a configured time interval, the configured time interval beginning after the start of the first configured amount of time.

20. The medium of claim 19, wherein the code is further configured to:
position unique samples that are included in the flow in a super-frame to be communicated to a next destination.

21. The medium of claim 20, wherein the code is further configured to:
receive the unique samples; and
evaluate the unique samples in order to restore a plurality of bits associated with the communications flow.

22. The medium of claim 20, wherein the code is further configured to:
ignore a framing protocol associated with the flow.

23. The medium of claim 20, wherein the flow is associated with a satellite communication.

24. The medium of claim 20, wherein the code is further configured to:
evaluate bit positions of a current sample of a current frame and compare those with bit positions of a previous sample in order to determine whether to perform a suppression operation associated with the flow.

25. A method comprising:
performing the following for a first configured amount of time:
receiving a set of current samples;
comparing, by a processor, the set of current samples with a set of previous samples;

determining, by the processor, a delta set comprising one or more current samples that are different from one or more corresponding previous samples;

determining, by the processor, a repeated set comprising one or more current samples that are the same as one or more corresponding previous samples;

transmitting the delta set;

suppressing the repeated set; and retransmitting one or more current samples of the delta set if one or more corresponding later samples repeat for a second configured amount of time.

26. The method of claim 25, further comprising:

transmitting by a processor, after the first configured amount of time, the repeated set of samples.

27. A non-transitory computer readable medium embodied with computer software code such that when executed by a processor is configured to perform the following for a first configured amount of time:

receive a set of current samples;

compare the set of current samples with a set of previous samples;

determine a delta set comprising one or more current samples that are different from one or more corresponding previous samples;

determine a repeated set comprising one or more current samples that are the same as one or more corresponding previous samples;

transmit the delta set; and suppress the repeated set; and the code further configured to:

retransmit one or more current samples of the delta set if one or more corresponding later samples repeat for a second configured amount of time, the second configured amount of time beginning after the start of the first configured amount of time.

28. The medium of claim 27, wherein the code is further configured to:

transmit, after the first configured amount of time, the repeated set of samples.

* * * * *